United States Patent
Pandala

(10) Patent No.: US 9,128,938 B2
(45) Date of Patent: Sep. 8, 2015

(54) APPARATUS, SYSTEMS AND METHODS FOR CONTENT AVAILABILITY NOTIFICATION

(75) Inventor: Sri Ramana Pandala, Atlanta, GA (US)

(73) Assignee: EchoStar Technologies L.L.C., Englewood, CO (US)

(*) Notice: Subject to any disclaimer, the term of this patent is extended or adjusted under 35 U.S.C. 154(b) by 487 days.

(21) Appl. No.: 12/790,686

(22) Filed: May 28, 2010

(65) Prior Publication Data

US 2011/0296456 A1    Dec. 1, 2011

(51) Int. Cl.

| H04N 21/43 | (2011.01) |
|---|---|
| H04N 21/442 | (2011.01) |
| H04N 21/472 | (2011.01) |
| H04N 21/488 | (2011.01) |
| G06F 17/30 | (2006.01) |
| H04N 5/445 | (2011.01) |
| H04N 21/81 | (2011.01) |

(52) U.S. Cl.
CPC ...... *G06F 17/30029* (2013.01); *H04N 5/44543* (2013.01); *H04N 21/44222* (2013.01); *H04N 21/47214* (2013.01); *H04N 21/8133* (2013.01); *H04N 2005/44556* (2013.01)

(58) Field of Classification Search
None
See application file for complete search history.

(56) References Cited

U.S. PATENT DOCUMENTS

| 6,909,726 | B1 | 6/2005 | Sheeran |
| 7,236,738 | B2 | 6/2007 | Settle |
| 7,260,601 | B1 | 8/2007 | Day et al. |
| 2004/0117831 | A1* | 6/2004 | Ellis et al. ............ 725/53 |
| 2004/0203374 | A1 | 10/2004 | Zilliacus |
| 2004/0210936 | A1* | 10/2004 | Rao et al. ............ 725/87 |
| 2005/0037706 | A1 | 2/2005 | Settle |
| 2007/0050818 | A1* | 3/2007 | Berger et al. ........ 725/58 |
| 2008/0307456 | A1 | 12/2008 | Beetcher et al. |
| 2008/0307462 | A1 | 12/2008 | Beetcher et al. |
| 2008/0307463 | A1 | 12/2008 | Beetcher et al. |
| 2009/0019485 | A1* | 1/2009 | Ellis et al. ............ 725/40 |
| 2009/0199227 | A1 | 8/2009 | Kennedy |
| 2009/0203374 | A1 | 8/2009 | Chun et al. |
| 2009/0249400 | A1* | 10/2009 | Carlberg et al. ...... 725/44 |
| 2009/0276815 | A1 | 11/2009 | Casagrande |

FOREIGN PATENT DOCUMENTS

TW            242379 B        10/2005

OTHER PUBLICATIONS

Paul, John; Systems and Methods for Searching Media Content; U.S. Appl. No. 12/648,024, filed Dec. 28, 2009.

* cited by examiner

*Primary Examiner* — Brian T Pendleton
*Assistant Examiner* — Jean D Saint Cyr
(74) *Attorney, Agent, or Firm* — Lowe Graham Jones PLLC

(57) ABSTRACT

Systems and methods are operable to notify a user of content availability. An exemplary embodiment receives a content availability notification request that specifies at least one content of interest, searches current electronic program guide (EPG) information to identify the content of interest, determines that the information identifying the specified content of interest is unavailable based upon the search of the current EPG information, generates a content availability reminder that is associated with the specified content of interest, monitors a content database to determine an availability of the specified content of interest identified in the content availability reminder, determines that the specified content of interest is available when the monitored content database indicates availability of the specified content of interest, and generates a content availability reminder notification that indicates at least a title of the specified content of interest.

16 Claims, 3 Drawing Sheets

APPARATUS, SYSTEMS AND METHODS FOR CONTENT AVAILABILITY NOTIFICATION

BACKGROUND

Media devices, such as a set top box, stereo, television, computer system, game system, or the like, are often configured to receive content from a content provider. The content provider typically provides the user an electronic program guide (EPG) that contains content schedule information for a future predefined time, such as several weeks. The EPG may be a type of a user interface that presents a menu, or a series of menus, on a display using a combination of text and symbols to indicate content viewing choices that may be selected by the user. The available content information may include the title of available content, along with the scheduled time and date of the content presentation, and a brief description of the content. The EPG typically indicates the "channel" of the available content that identifies the originating source of the content, such as a television studio, a premium movie provider, a national program provider, etc.

The user may select content for current viewing, further viewing, and/or recording. However, particular content of interest may not be available for current presentation or future presentation during the period available of the EPG. For example, the user may have missed a prior presentation of the favorite serial program, and the EPG does not indicate that the serial program will be re-presented in the near future. As another example, the user may be interested in viewing a new release movie that is not yet available from the content provider. As yet another example, the user may wish to view an old classic movie that is not scheduled for presentation by the content provider.

Accordingly, there is a need in the arts to assist a user to access content of interest that cannot be selected for presentation via their EPG.

SUMMARY

Systems and methods of notifying a user of content availability are disclosed. An exemplary embodiment receives a content availability notification request that specifies at least one content of interest, searches current electronic program guide (EPG) information to identify the content of interest, determines that the information identifying the specified content of interest is unavailable based upon the search of the current EPG information, generates a content availability reminder that is associated with the specified content of interest, monitors a content database to determine an availability of the specified content of interest identified in the content availability reminder, determines that the specified content of interest is available when the monitored content database indicates availability of the specified content of interest, and generates a content availability reminder notification that indicates at least a title of the specified content of interest.

BRIEF DESCRIPTION OF THE DRAWINGS

Preferred and alternative embodiments are described in detail below with reference to the following drawings.

DETAILED DESCRIPTION

Figure 1:
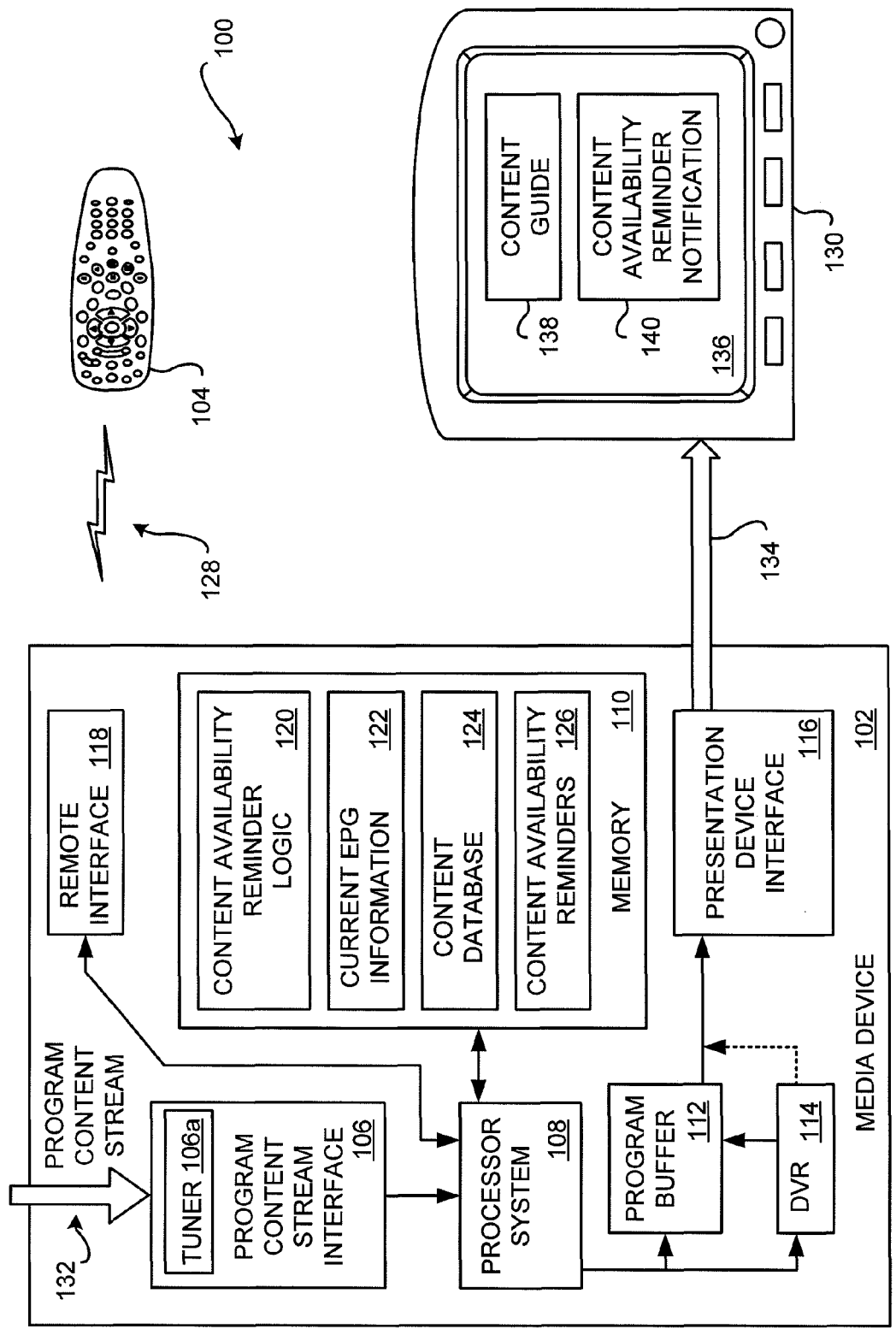
FIG. 1 is a block diagram of an embodiment of a content availability notification system implemented in a media device.

FIG. 1 is a block diagram of an embodiment of a content availability notification system 100 implemented in a media device 102, such as, but not limited to, a set top box (STB). Embodiments of the content availability notification system 100 may be implemented in other media devices, such as, but not limited to, stereos, radios, televisions (TVs), digital video disc (DVD) players, digital video recorders (DVRs), game playing devices, personal computers (PCs), cellular phone devices, laptop computers, or computer work stations.

Embodiments of the content availability notification system 100 enable a user (not shown) to make a content availability notification request for particular content of interest that is not currently available, or is not available in the near future, from their content service provider. In an exemplary embodiment, the user operates a remote control 104 to specify the particular content of interest to the content availability notification system 100. If the specified content of interest is not currently scheduled for presentation, a content availability reminder is generated that identifies the specified content of interest. The availability of the specified content of interest identified in the content availability reminder is monitored.

When the specified content of interest is scheduled for presentation, a content availability reminder notification is provided to the user to advise the user of the availability of the specified content of interest. The content availability reminder notification may indicate when the specified content of interest will become available.

In some embodiments, the content availability notification system 100 may assist the user in identifying and selecting the particular content of interest in situations where the user is not able to accurately specify the content of interest, such as when a search of an electronic program guide does not locate the program of interest. Embodiments access another database that is more likely to provide information pertaining to the content of interest. Thus, the user is able to search for and specifically specified content of interest with the aid of the content availability notification system 100.

When the specified content of interest is scheduled for presentation, the user is provided at least one content availability reminder notification indicating the scheduled presentation time and the source of the specified content of interest. Accordingly, the user understands that the specified content of interest will be available for presentation. Alternatively, or additionally, when the particular specified content of interest is finally presented at some future time, the user may be provided at least one real-time content availability reminder notification. In some embodiments, the user's media device 102 may automatically access and/or record the specified content of interest.

Some embodiments enable the content service provider to track individual requests for specified content of interest from the user and its other customers. When the number of requests for a particular specified content of interest exceeds a threshold, the content service provider may elect to schedule that particular specified content of interest for presentation. The content service provider may then notify the user and its other interested customers of the scheduled presentation of the specified content of interest.

The non-limiting exemplary media device 102 comprises a program content stream interface 106, a processor system 108, a memory 110, a program buffer 112, an optional digital video recorder (DVR) 114, a presentation device interface 116, and a remote interface 118. The memory 110 comprises portions for storing content availability reminder logic 120, current electronic program guide (EPG) information 122, an optional content database 124, and one or more content availability reminders 126. Other media devices may include some, or may omit some, of the above-described media processing components. Further, additional components not described herein may be included in alternative embodiments.

The functionality of the media device 102, here a set top box, is now broadly described. The user operates their remote control 104 to generate and transmit user commands via a wireless signal 128 that is received by the remote interface 118. Accordingly, the media device 102 can then control itself and/or the various media devices that it is communicatively coupled to, such as the exemplary television (TV) 130, in accordance with the generated user commands.

A content service provider provides program content that is received in one or more program content streams 132. A program content stream 132 typically comprises a plurality of programs multiplexed together. The one or more program content streams 132 are communicated to the media device 102 from a remote head end facility (not shown) operated by the content service provider. Non-limiting examples of such media systems include satellite systems, cable system, and the Internet. For example, if the content service provider provides programming via a satellite-based communication system, the media device 102 is configured to receive one or more broadcasted satellite signals detected by an antenna (not shown). Alternatively, or additionally, the program content stream 132 can be received from one or more different sources, such as, but not limited to, a cable system, a radio frequency (RF) communication system, or the Internet.

The one or more program content streams 132 are received by the program content stream interface 106. One or more tuners 106a in the program content stream interface 106 selectively tune to one of the program content streams 132 in accordance with instructions received from the processor system 108. The processor system 108, based upon a request for a program of interest specified by the user, parses out program content associated with the content of interest. The content of interest is then assembled into a stream of video and/or audio information which may be stored by the program buffer 112 such that the content of interest can be streamed out to the media presentation device, such as the exemplary television 130, via a signal 134 output from the presentation device interface 116. The content may then be presented on a display 136 of the exemplary television 130, for example. Alternatively, or additionally, the content of interest may be saved into the DVR 114 for later presentation. In alternative embodiments, the program content streams 132 may stored for later decompression, processing and/or decryption.

From time to time, information populating the current EPG information 120 portion of the memory 110 is communicated to the media device 102, via the program content stream 132 or via another suitable media. The current EPG information 122 stores the information pertaining to currently scheduled content over some predefined period, such as the next nine days. The content schedule information may include, but is not limited to, a scheduled presentation start and/or an end time, a program source (e.g., a channel, video on demand, pay-per-view, premium channel, etc.), and/or other descriptive information of interest. The content's descriptive information may include the title of the content, names of performers or actors, date of creation, and a summary describing the nature of the content. Any suitable information may be included in the content's supplemental information. Upon receipt of a command from the user requesting presentation of an EPG display, the information in the current EPG information 120 is retrieved, formatted, and then presented on the display 136 as an EPG.

As noted above, the user may be interested in particular content that is not scheduled for presentation. For example, absence of the content of interest from the EPG may indicate to the user that the particular content of interest is not available for presentation. That is, after performing a futile search through the EPG, the user would then understand that their particular content of interest is unavailable. As another example, the user may appreciate that they missed the presentation of the content of interest, such as when they return home after the scheduled presentation time of their favorite weekly serial program.

The user, via their remote control 104, then initiates the content availability notification system 100. In response to the user command, the processor system 108 retrieves and executes the content availability reminder logic 120. In the various embodiments, the user specifies the particular content of interest that is not currently available from the content service provider. Then, the content availability notification system 100 monitors one or more information sources to determine the availability of the specified content of interest. When the content availability notification system 100 determines availability of the specified content of interest, the content availability notification system 100 provides one or more content availability reminder notifications indicating the availability of the specified content of interest. Availability of the specified content of interest is determined when the monitored information source(s) indicates that the specified content of interest will be available. For example, the information source may contain content presentation schedules. If a content presentation schedule exists, then embodiments determine that the specified content of interest is available. When the information source is updated or the like to indicate that the specified content of interest will be available, embodiments may then determine that the specified content of interest is available.

Some embodiments include an optional content database 124 that locally resides on the memory 110 of the media device 102. The local content database 124 is a source of information used by the content availability notification system 100 to determine availability of the specified content of interest. In an exemplary embodiment, the content database 124 is provided by the content service provider. Alternatively, or additionally, the content database 124 may be built over time based on the content presentation history on the media device 102.

The content database 124 is a repository of identifiers for selected content. The content database 124 may be conceptually viewed as an index of the identifiers for a very large number of different content. The identifiers may be a title of the content. Alternatively, or additionally, a program identifier, a catalogue number, and/or another reference may be used to identify a particular program. Thus, the content database 124 has one or more identifiers for many movies, television programs, special events, and other media.

Additionally, if available, the content database 124 may include the future scheduled presentation date and time, and optionally the source, of selected content. For example, even if the presentation schedule for the specified content of interest is beyond the period of the EPG, that presentation schedule may be included in the content database 124. Accordingly, the content availability notification system 100 can monitor the presentation schedule and determine when additional information is available in the EPG, for example, and then generate at least one content availability reminder notification for the specified content of interest.

In the various embodiments, the user specifies the particular content of interest. However, it may be difficult for the user to specify a particular content of interest with sufficient accuracy and/or granularity so that the content availability notification system 100 appreciates the user's intent. For example, the user may not correctly and/or precisely spell the title of the content of interest. Possibly the user has left off part of the title, such as the word "the" or the like. Or, there may be multiple content having the same title, such as an old movie and a recent re-make of the movie. Serial programs may have the same title, yet have many different available episodes. Thus, the user may require assistance from the content availability notification system 100 from time to time to accurately specify the content of interest. In some situations, the user may wish to identify content of interest based on another criteria, such as by actor, location, content theme, or the like.

In an exemplary embodiment, the user may perform an alpha search by title for the content of interest. In such embodiments, the user may enter part of, or all of, the name and/or other information pertaining to the particular content of interest using an emulated keyboard or other alpha-numeric input graphical user interface (GUI). Alternatively, or additionally, the user may specify the particular content of interest via keyed entries using the buttons and/or controllers on their remote control 104.

In embodiments with the optional content database 124, a searchable content guide 138 may be presented in a GUI format on the display 136 of the TV 130. The content guide 138 may resemble an EPG, although any suitable presentation format may be used. Thus, the GUI presenting the information in the content database 124 interactively assists the user in identifying particular content of interest.

Other information of interest may be optionally included in the content database 124. For example, a name of a performer or actor, date of creation, and a summary describing the nature of the content may be included. Thus, if the user performs a search based on the other information, the content availability notification system 100 may assist the user in correctly identifying and specifying the content of interest.

When the particular content of interest is identified on the content guide 138, the content of interest may be specified by the user. For example, one of the buttons or controllers on the remote control 104 may be used to specify the identified content of interest. User convenience is facilitated when the content guide 138 is provided in a GUI interface format.

In response to the specification of the particular content of interest, the content availability notification system 100 determines availability of the specified content of interest. Availability of the specified content of interest is determined when the scheduled presentation time and source of the specified content of interest is determinable from the sources of information accessed by the content availability notification system 100.

When the availability of the specified content of interest is determined, a content availability reminder is generated and stored in the content availability reminders 126 portion of the memory 110. The content availability reminder is associated with the specified content of interest. In an exemplary embodiment, the content availability reminder is associated with, and may include, the title or other identifier of the particular specified content of interest. Further, the content availability reminder may be associated with, and may include, the presentation schedule of the particular content of interest, the channel or other source of the particular specified content of interest, and/or other information of interest.

On the other hand, the content availability notification system 100 may not be able to determine the availability of the specified content of interest. Accordingly, the title or other identifier of that particular content of interest is stored in the content availability reminders 126 portion of the memory 110 (or in another suitable portion of the memory 110). The content availability notification system 100 continues to monitor its sources of information for the availability of the specified content of interest. When the content availability notification system 100 determines availability of the specified content of interest, the content availability reminder is generated and stored in the content availability reminders 126 portion of the memory 110.

The current EPG 122 is a source of information that embodiments of the content availability notification system 100 may use to determine availability of the specified content of interest. As noted above, the current EPG information 122 is periodically updated with information pertaining to upcoming scheduled content. Accordingly, the content availability notification system 100 may periodically monitor EPG update information, monitor the EPG updates as they are received, and/or the monitor the current EPG information 122 for the availability of the specified content of interest. When the content availability notification system 100 determines availability of the specified content of interest from the EPG update information and/or the current EPG information 122, the content availability reminder is generated as stored in the content availability reminders 126 portion of the memory 110.

In embodiments with the content database 124, the content service provider may provide periodic updates to the content database 124. For example, all of, or a portion of, an internet movie database (IMDB) may be downloaded into the content database 124. The update information may include available presentation schedules for some of the content identified in the content database 124. When the content database 124 is updated with schedule information for the specified content of interest, the content availability notification system 100 may then determine availability of the specified content of interest and generate a corresponding content availability reminder.

The generated content availability reminder is used to notify the user of availability of the specified content of interest. In an exemplary embodiment, the content availability notification system 100 notifies the user of the availability of the specified content of interest by generating and by presenting a content availability reminder notification 140. In the exemplary embodiment illustrated in FIG. 1, the content availability notification system 100 generates a graphical content availability reminder notification that is communicated to the TV 130 and that displayed on its display 136. Some media devices 102 may include the display 136 as a component.

The content reminder notification 140 may be generated and/or presented to the user at various times. In an exemplary embodiment, the content reminder notification 140 is generated and/or presented to the user when the specified content of interest is available for presentation on the media device 102. Alternatively, or additionally, the content reminder notification 140 may be generated and/or presented to the user when availability of the specified content of interest is determined. Alternatively, or additionally, the content reminder notification 140 may be generated and/or presented to the user at a predetermined time prior to the scheduled availability of the specified content of interest. For example, the content reminder notification 140 is generated and/or presented one hour prior to the scheduled presentation of the specified content of interest.

In some embodiments, presentation of the specified content of interest may already be underway. For example, presentation may already be underway when the user first activates the media device 102 and/or the TV 130. Here, communicating the content reminder notification 140 to the TV 136 would not result in notification to the user. In this simplified example, the content reminder notification 140 is presented in response to the activation of the media device 102 and/or the TV 130.

The content reminder notification 140 may be presented to the user in a variety of different manners. In an exemplary embodiment, the content availability reminder notification 140 may be presented as a pop-up window or the like. The title, the scheduled start and end times and/or duration, a graphical icon or the like, and/or other information of interest pertaining to the particular specified content of interest may be included in the content availability reminder notification 140. The content availability reminder notification 140 may be presented for a predetermined time and then removed. Alternatively, the content availability reminder notification 140 may be presented until some required user action occurs. For example, the user may be required to specifically disregard the content availability reminder notification 140, may be required to tune to the source where the specified content of interest is being presented, and/or may be required to initiate a recording into the DVR.

In some embodiments, the content availability reminder notification 140 may be incorporated into a presented EPG to indicate availability of the specified content of interest. For example, a graphical icon and/or alpha-numeric message may be added into the portion of the presented EPG that provides information pertaining to the specified content of interest. Alternatively, or additionally, the content availability reminder notification 140 may change the background color of that portion of the EPG pertaining to the specified content of interest. In a non-limiting exemplary embodiment, blue backgrounds are normally used on the presented EPG. However, the background region for the specified content of interest may be changed to a bright noticeable color, such as yellow or the like, to indicate that the specified content of interest is scheduled for presentation.

Some embodiments may alternatively, or additionally, issue an audio advisory or the like to indicate that the specified content of interest is available. For example, a unique tone may be generated. Or, a simulated voice message may be generated specifying the title, the schedule and/or the source for the specified content of interest.

Some embodiments may alternatively, or additionally, automatically cause the media device 102 to tune to the particular program content stream 132 having the specified content of interest when the specified content of interest is available for presentation on the media device 102. Thus, the currently presented content is interrupted and is replaced by the specified content of interest. Alternatively, the specified content of interest may be presented in a picture-in-picture (PIP) or other dual image format.

Some embodiments may alternatively, or additionally, automatically record the specified content of interest into the DVR 114. For example, if the user is not using the media device 102 at the time of the presentation of the specified content of interest, the saved content of interest will be available for later presentation to the user at their convenience. Or, if the user is using the media device 102 for presentation of other content, then the specified content of interest may be saved without interruption of the other presented content.

Some service providers provide selected content on a for-pay basis. For example, content may be available on a pay-for view type basis, may be available for a specified duration, and/or may be available on a premium service channel. Non-limiting examples for-pay services include video on demand (VOD) and premium movie channels. Some embodiments of the content availability notification system 100 may be configured to automatically access the specified for-pay content when it becomes available such that the appropriate fee is charged to the user's account.

In other embodiments, pre-authorization from the user (prior to access to the specified pay-per-view content of interest) is required. For example, a special GUI content availability reminder notification 140 may be presented to the user that requires pre-authorization from the user to access particular for-pay content of interest. In response to presentation of the special content availability reminder notification 140, the user may then authorize or decline access to the specified for-pay content of interest.

An unforeseen and unexpected advantage of the various embodiments that are configured to access particular for-pay content is that the user automatically receives, or is directed to the availability of, the for-pay content. For example, new movies are initially released at theatres. After the run of the new movie at the theaters has been completed, the new movie is then released on other media, such as on rental DVDs and VOD. It is appreciated that the content service provider is competing with DVD rentals by providing the new movie on their VOD system. Embodiments of the content availability notification system 100 enable to the user to predefine a listing of the new movies and/or other for-pay programming of interest, referred to as a "VOD Wish List" or the like. Accordingly, the user does not need to obtain a rental DVD of the new movie and/or other for-pay programming. Such embodiments provide more convenient access to these new movies and/or other for-pay programming, and thus provide a competitive advantage to the content service provider over DVD rental companies.

Figure 2:
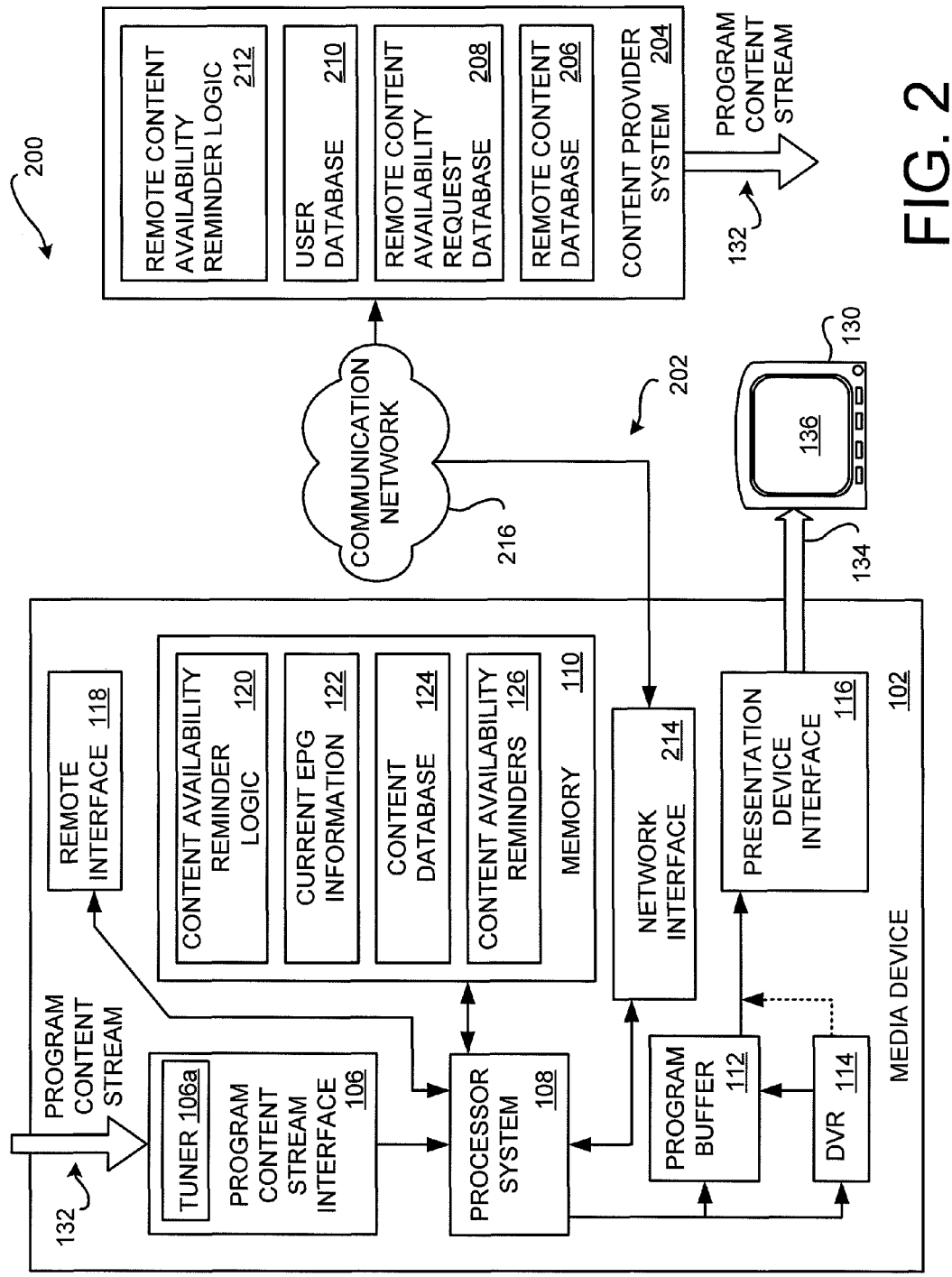
FIG. 2 is a block diagram of an alternative embodiment of a content availability notification system implemented in the media device.

FIG. 2 is a block diagram of an alternative embodiment of a content availability notification system 200 implemented in the media device 102. This exemplary embodiment provides a backchannel communication path 202 between the media device 102 and a remote site, such as the exemplary content provider system 204. The backchannel communication path 202 is a communication path between then media device 102 and the remote site that permits communication from the media device 102 to the remote site. In some embodiments, the backchannel communication path 202 provides two-way communication between the media device 102 and the remote site.

In this exemplary embodiment, the content provider system includes systems and components (not shown) that provide the program content stream 132 that is received by the media device 102. Additionally, the content provider system 204 comprises a remote content database 206, a remote content availability request database 208, an optional user database 210, and a remote content availability reminder logic 212. The media device 102 comprises a network interface 214 that provides connectivity to the content provider system 204 via a suitable communication network 216.

In an exemplary embodiment, when the user specifies particular content of interest that is not currently available or scheduled for future presentation, the executing content availability reminder logic 120 generates a content availability notification request that is communicated from the media device 102 to the content provider system 204 via the backchannel 202. The executing remote content availability reminder logic 212 at the content provider system 204 receives the content availability notification request to determine the availability of the specified content of interest. Availability of the specified content of interest is determined based upon information in the remote content database 206.

When the content provider system 204 determines availability of the specified content of interest, the content provider system 204 provides schedule and content source information back to the media device 102 in an exemplary embodiment. The executing content availability reminder logic 120, based on the received information, then generates and stores a corresponding content availability reminder indicating the availability of the specified content of interest in the content availability reminders 126 portion of the memory 110. In an alternative embodiment, the content availability reminder is generated at the content provider system 204 by the executing remote content availability reminder logic 212. The remotely generated content availability reminder is then communicated back to the media device 102. The remotely generated content availability reminder may be sent to the media device at any suitable time.

The schedule and content source information that is communicated back to the media device 102, or alternatively the content availability reminder that is generated at the content provider system 204, may be communicated over the backchannel 202. Alternatively, or additionally, depending upon characteristics of the media device 102, the information that is communicated back to the media device 102 may be communicated in the program content stream 132 if the identifier of the media device 102 is associated with the communication.

In some instances, the specified content of interest is not scheduled for future presentation. Accordingly, the content availability notification request is stored in the user database 210. The user database 210 identifies the specified content of interest and the particular user making the content availability notification request. When a schedule for the particular specified content of interest becomes available, the schedule and content source, or alternatively the content availability reminder generated at the content provider system 204, may be communicated back to the media device 102.

Since the remote content database 206 may reside on a very large and complex memory media, a relatively large amount of possible available program content can be quickly and efficiently analyzed to determine if and/or when the specified content of interest will be available for presentation at the media device 102. Accordingly, memory capacity of the memory 110 in the media device 102 may be relatively less in this embodiment of the content availability notification system 200. Additionally, communication bandwidth requirements of the system may be relatively reduced as updates to the content database 126 used in the content availability notification system 100 embodiment may be eliminated.

The communication network 216 is illustrated as a generic communication system. In one embodiment, the communication network 216 comprises the Internet. Accordingly, the network interface 214 is a suitable modem. Alternatively, the communication network 216 may be a telephony system, a radio frequency (RF) wireless system, a microwave communication system, a fiber optics system, an intranet system, a local access network (LAN) system, an Ethernet system, a cable system, a radio frequency system, a cellular system, or a hybrid system comprised of multiple types of communication media.

In an alternative embodiment, the above-described content availability notification system 100 (FIG. 1) and the content availability notification system 200 (FIG. 2) cooperatively act to process a received user request for the content availability reminder notification and to determine the availability of the specified content of interest. For example, the executing content availability reminder logic 120 may assist the user in identifying the content of interest with specificity, and/or may initially query the current EPG information to determine the availability of the specified content of interest. If availability of the specified content of interest cannot be locally determined, then the content availability notification request can be forwarded to the content provider system 204 for further assessment.

In some embodiments, the content service provider keeps track of the number of individual requests for the specified content of interest from the user and its other customers. The number of requests for the particular specified content of interest, and an identifier of the requestors, may be stored in the remote content availability request database 208 or in another suitable data repository. In exemplary embodiments, the identifier of the requestor may be the requestor's name, the requestor's account number, an identifier of the requestor's media device, or the like.

The number of requests is updated each time a new content availability notification is received. When the number of requests reaches a threshold, the specified content of interest is scheduled for presentation. Then, the content availability reminder for the specified content of interest is generated and communicated to the media devices 102 associated with the requestors.

For example, a particular classic movie may be requested by the a plurality of customers of the content service provider. When the total number of requests for a particular classic movie exceeds a threshold, the content service provider may elect to schedule that the classic movie for presentation. The content service provider may then notify the user and its other interested customers of the scheduled presentation of the classic movie.

In alternative embodiments, any suitable remote site may be configured to receive content availability notification requests from the media device 102. For example, a dedicated portion of the content service provider's web site may be used to receive content availability notification requests, provide schedule and content source information back to the media device 102, and/or generate and communicate content availability reminders to the media device 102. As another example, a special purpose site may be configured to process content availability notification requests from customers of multiple content service providers.

Figure 3:
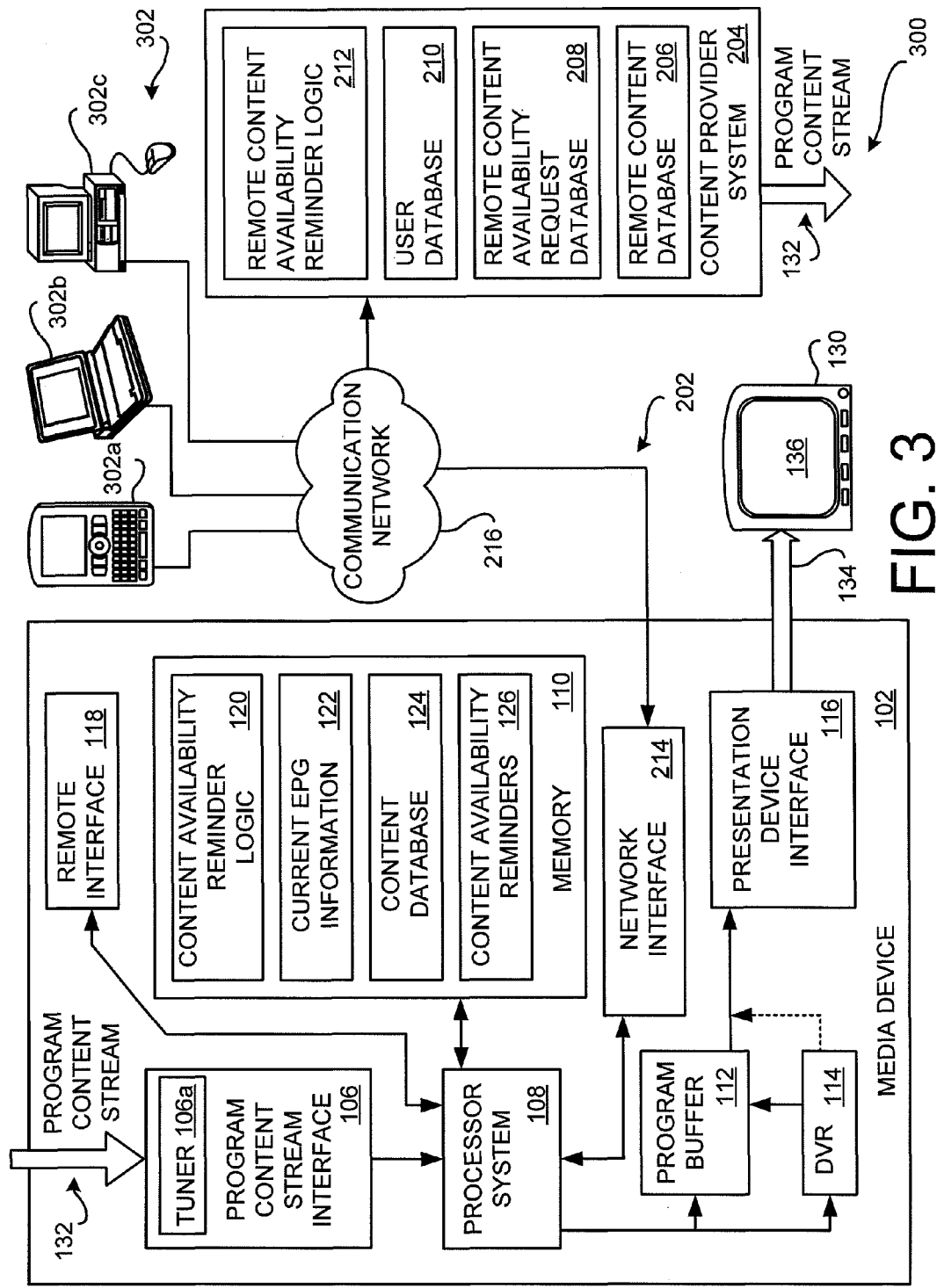
FIG. 3 is a block diagram of an alternative embodiment of a content availability notification system configured to receive content availability notification requests from remote devices.

FIG. 3 is a block diagram of an alternative embodiment of a content availability notification system 300 configured to receive content availability notification requests from one or more remote devices 302. The remote devices 302 may be operated by the user to generate one or more content availability notification requests. This exemplary embodiment enables communication between the media device 102, the plurality of remote devices 302, and/or the remote site, such as the exemplary content provider system 204.

Examples of the remote device 300 include a cellular phone device 302a, a laptop computer 302b, and a computer work station 302c. The remote devices 300 may be communicatively coupled to one or more remote sites, such as the exemplary content provider system 204 via the communication network 216. Alternatively, or additionally, the remote devices 302 may be communicatively coupled to one or more media devices 102 via the communication network 216.

The user, operating one of the remote devices 302, generates a content availability notification request which is then communicated out to the remote site and/or the media device 102. Content availability reminders may then be generated as described herein.

In some embodiments, the content availability reminder may be returned to the user's remote device 302. Accordingly, a suitable content availability reminder notification can be generated and presented to on the user's remote device 302.

It should be emphasized that the above-described embodiments of the content availability notification system 100 are merely possible examples of implementations of the invention. Many variations and modifications may be made to the above-described embodiments. All such modifications and variations are intended to be included herein within the scope of this disclosure and protected by the following claims.

The invention claimed is:

1. A method of notifying a user of content availability, the method comprising:
   presenting information identifying a plurality of programs to the user of a media device, wherein the information identifying the plurality of programs is based on a content database stored at the media device;
   receiving at the media device a content availability notification request from the user specifying a program of interest identified from the presented plurality of programs;
   searching at the media device current electronic program guide (EPG) information stored at the media device to identify the program of interest;
   determining at the media device that the information identifying the specified program of interest is unavailable based upon the search of the current EPG information that is stored at the media device;
   generating at the media device a content availability reminder based on the content database, wherein the content availability reminder is associated with the specified program of interest;
   storing at the media device the generated content availability reminder;
   receiving at the media device EPG information updates, wherein the EPG information updates are used to update EPG information stored at the media device, wherein the updated EPG information indicates a schedule of programs that are currently available or are scheduled for future presentation;
   monitoring at the media device on a periodic basis at least one of the received EPG information updates received at the media device and the updated EPG information stored at the media device to determine availability of the specified program of interest;
   determining at the media device that the specified program of interest is available when the monitored at least one of the EPG information updates received at the media device and the updated EPG information stored at the media device indicates availability of the specified program of interest; and
   generating at the media device a content availability reminder notification in response to determining that the program of interest is currently available or is scheduled for future presentation, wherein the content availability reminder notification is presented to the user of the media device and indicates at least a title of the specified program of interest.

2. The method of claim 1, further comprising:
   communicating the content availability notification request from the media device to a remote site, wherein the remote site further monitors a remote content database to determine availability of the specified program of interest, wherein the remote site determines that the specified program of interest is available when the monitored remote content database indicates at least a future scheduled availability of the specified program of interest, and wherein the remote site communicates information to the media device indicating at least the future scheduled availability of the specified program of interest; and
   receiving at the media device the information from the remote site indicating at least the future scheduled availability of the specified program of interest.

3. The method of claim 1, further comprising:
   communicating the content availability reminder notification, wherein the content availability reminder notification is presented on a display.

4. The method of claim 3, wherein the content availability reminder notification is communicated when the availability of the specified program of interest is determined 5. The method of claim 1, wherein the content availability reminder notification further indicates a scheduled presentation time of the specified program of interest.

6. The method of claim 1, wherein the content availability reminder notification further indicates a source of the specified program of interest.

7. The method of claim 1, wherein presenting the information identifying the plurality of programs to the user further comprises:
   generating at the media device a searchable content guide based on the content database;
   presenting the searchable content guide in a graphical user interface (GUI) format on a display, wherein the searchable content guide is configured to receive at least one search command to interactively assist the user in identifying at least a title of each of a first plurality of programs, and wherein the searchable content guide is configured to receive a specification of one of the identified first plurality of programs as the specified program of interest; and
   generating the content availability notification request based upon the specified program of interest.

8. A method of notifying a user of content availability, the method comprising:
   presenting information identifying a first plurality of programs to the user of a media device, wherein the information identifying the first plurality of programs is based on a content database stored at the media device;
   periodically receiving and storing electronic program guide (EPG) information at the media device, wherein an EPG identifies a second plurality of programs that are currently available or are scheduled for future presentation at the media device;
   receiving a content availability notification request at the media device from the user, wherein the content availability notification request specifies a program of interest identified from the presented first plurality of programs identified from the content database;
   searching at the media device current EPG information stored at the media device to identify the program of interest;
   determining at the media device that the specified program of interest is unavailable based upon the search of the current EPG information that is stored at the media device;
   generating at the media device a content availability reminder based on the content database in response to determining that the specified program of interest is unavailable, wherein the content availability reminder is associated with the specified program of interest;

monitoring at the media device the periodically received EPG information to determine availability of the specified program of interest;

determining at the media device that the specified program of interest is available when the monitoring of the EPG information performed at the media device indicates that the specified program of interest is currently available or becomes scheduled for future presentation;

generating at the media device a content availability reminder notification, wherein the content availability reminder notification indicates at least a title of the specified program of interest; and communicating the content availability reminder notification from the media device, wherein the content availability reminder notification is presented to the user of the media device on a display.

9. The method of claim 8, wherein the content availability reminder notification is presented as a graphical user interface (GUI) content availability reminder notification that is configured to receive at least one user generated command to record the specified program of interest that is scheduled for future presentation, and further comprising:

recording the program of interest in response to the user generated command.

10. The method of claim 8, wherein the content availability reminder notification is presented as a graphical user interface (GUI) content availability reminder notification that is configured to receive at least one user generated command to present the specified program of interest that is scheduled for future presentation, and further comprising:

tuning to a program content stream containing the program of interest in response to the user generated command.

11. The method of claim 8, wherein the content availability reminder notification is presented as a graphical user interface (GUI) content availability reminder notification that is configured to receive at least one user generated command authorizing payment for at least one for-pay program of interest, and further comprising:

tuning to a program content stream containing the for-pay program of interest in response to the user generated command authorizing payment for the for-pay program of interest.

12. The method of claim 8, wherein communicating the content availability reminder notification from the media device further comprises:

communicating the content availability reminder notification from the media device at a predefined time prior to a time that the specified program of interest is scheduled for future presentation.

13. The method of claim 8, wherein communicating the content availability reminder notification from the media device further comprises:

immediately communicating the content availability reminder notification from the media device when the specified program of interest is currently available.

14. A content availability notification system in a media device, comprising:

a memory, wherein the memory of the media device stores EPG information that identifies a first plurality of programs that are currently available or are scheduled for future presentation, and wherein the memory of the media device stores a content data base that identifies a second plurality of programs that are not currently available or are not scheduled for future presentation;

a program content stream interface configured to receive at least one program content stream from a content service provider, wherein the first plurality of programs reside in the at least one program content stream;

a processor system communicatively coupled to the memory and the program content stream interface, wherein the processor system is configured to process the received program content stream into content that is presentable on a display to a user;

content availability reminder logic residing in the memory of the media device and configured, when executed by the processor system of the media device, to:

receive a content availability notification request from the user of the media device, wherein the content availability notification request specifies at least one content of interest;

determine that the specified content of interest is unavailable in the first plurality of programs;

generate a content availability reminder, wherein the content availability reminder is associated with the specified content of interest;

monitor updates to the EPG information to determine an availability of the specified content of interest identified in the content availability reminder;

determine that the specified content of interest is available when the monitored EPG information indicates that the specified content of interest is currently available or has become scheduled for future presentation; and generate a content availability reminder notification, wherein the content availability reminder indicates at least a title of the specified content of interest; and a digital video recorder configured to record the specified content of interest identified in the content availability notification request when received in the at least one program content stream.

15. The content availability notification system of claim 14, further comprising:

a remote interface configured to receive the content availability notification request from a remote control.

16. The content availability notification system of claim 14, further comprising:

a presentation device interface configured to communicate the generated content availability reminder to the display.

* * * * *